(12) United States Patent
Weatherman et al.

(10) Patent No.: US 7,951,227 B2
(45) Date of Patent: May 31, 2011

(54) COMPOSITION AND METHOD FOR DUST SUPPRESSION WETTING AGENT

(76) Inventors: Greg Weatherman, Arlington, VA (US); Marcia Celusnek Cash, Arlington, VA (US)

( * ) Notice: Subject to any disclaimer, the term of this patent is extended or adjusted under 35 U.S.C. 154(b) by 156 days.

(21) Appl. No.: 12/155,447

(22) Filed: Jun. 4, 2008

(65) Prior Publication Data

US 2009/0301302 A1 Dec. 10, 2009

(51) Int. Cl.
*B01D 59/26* (2006.01)
(52) U.S. Cl. ............... 95/149; 95/152; 95/154; 95/230; 252/88.1; 252/88.2
(58) Field of Classification Search ............ 95/149, 95/150, 151, 152, 153, 154, 155, 156, 157, 95/158, 159, 160, 161, 162, 163, 164, 165, 95/166, 167, 168, 169, 170, 171, 172, 173, 95/174, 175, 176, 177, 178, 179, 180, 181, 95/182, 183, 184, 185, 186, 187, 188, 189, 95/190, 191, 192, 193, 194, 195, 196, 197, 95/198, 199, 200, 201, 202, 203, 204, 205, 95/206, 207, 208, 209, 210, 211, 212; 95/213, 95/214, 215, 216, 217, 218, 219, 220, 221, 95/222, 223, 224, 225, 226, 227, 228, 229, 95/230, 231, 232, 233, 234, 235, 236, 237, 95/238, 239, 240; 588/2, 16, 18; 15/320, 15/321; 134/4, 200, 201; 252/88.1, 88.2
See application file for complete search history.

(56) References Cited

U.S. PATENT DOCUMENTS

| | | | | |
|---|---|---|---|---|
| 3,044,235 A * | 7/1962 | Schneider | .................. | 95/154 |
| 4,136,050 A * | 1/1979 | Brehm | .................. | 252/88.1 |
| 4,169,170 A * | 9/1979 | Doeksen | .................. | 44/541 |
| 4,171,270 A * | 10/1979 | Sung et al. | .................. | 508/273 |
| 4,369,121 A * | 1/1983 | Callahan et al. | .................. | 299/12 |
| 4,425,252 A * | 1/1984 | Cargle et al. | .................. | 252/88.1 |
| 4,428,984 A * | 1/1984 | Shimizu et al. | .................. | 427/220 |
| 4,487,615 A * | 12/1984 | Taylor et al. | .................. | 95/154 |
| 4,693,755 A * | 9/1987 | Erzinger | .................. | 134/4 |
| 4,774,974 A * | 10/1988 | Teter | .................. | 134/110 |
| 4,866,105 A * | 9/1989 | Batdorf | .................. | 523/103 |
| 4,897,121 A * | 1/1990 | Sasaki | .................. | 134/22.18 |
| 5,004,483 A * | 4/1991 | Eller et al. | .................. | 95/10 |
| 5,034,247 A * | 7/1991 | Batdorf | .................. | 427/221 |
| 5,052,756 A * | 10/1991 | Wada et al. | .................. | 299/17 |
| 5,090,972 A * | 2/1992 | Eller et al. | .................. | 95/10 |
| 5,173,094 A * | 12/1992 | Brady | .................. | 96/296 |
| 5,302,004 A * | 4/1994 | Docherty | .................. | 299/18 |
| 5,439,322 A * | 8/1995 | Barnett | .................. | 588/254 |
| 5,514,222 A * | 5/1996 | Williams | .................. | 134/42 |
| 5,595,586 A * | 1/1997 | Sivavec | .................. | 95/143 |
| 5,595,782 A * | 1/1997 | Cole | .................. | 427/212 |
| 5,878,355 A * | 3/1999 | Berg et al. | .................. | 588/2 |
| 2004/0065198 A1* | 4/2004 | Wolff et al. | .................. | 95/154 |
| 2004/0192789 A1* | 9/2004 | Smith et al. | .................. | 516/53 |
| 2005/0263003 A1* | 12/2005 | Fornai et al. | .................. | 95/211 |

* cited by examiner

*Primary Examiner* — Duane Smith
*Assistant Examiner* — Thomas McKenzie
(74) *Attorney, Agent, or Firm* — Jonathan E. Grant; Grant Patent Services

(57) ABSTRACT

This disclosure teaches a composition and process which makes it possible to remove floating particulates or prevent the dissemination or particulates, by the misting of a solution that readily captures any particulate material in the air. More specifically, the present disclosure teaches the composition and use of aromatic compounds that are semi-volatile organic compounds (SVOCs) or slow evaporators in water-based carriers with surfactants as the misting/fogging agent for dust suppression. The particulate material is lowered to surfaces and removed by vacuuming, damp-wiping or using a dry cloth with a cationic charge (static cloth). This method can be achieved with neutral air pressure differentials in the work areas.

10 Claims, No Drawings

COMPOSITION AND METHOD FOR DUST SUPPRESSION WETTING AGENT

FIELD OF THE DISCLOSURE

This disclosure is a new method for controlling dust or particulates, such as asbestos or inert biological materials, in contained or uncontained areas during remediation or renovation activities.

BACKGROUND OF THE DISCLOSURE

Up until 1974, asbestos had been respected and used in industry due to its excellent incombustible and refractory properties, heat-insulating properties, and sound-absorbing qualities. Normally, asbestos was incorporated on walls, pipes, and industrial equipment in schools, residences, factories, office buildings, ships, and older motor vehicles, whenever sound, heat, or fire proofing was required.

However, over time, asbestos fibers tend to become airborne, as the surface spray coated with asbestos is vibrated or an object collides against the asbestos-coated surface or when the binder used in the coating deteriorates. Often, and perhaps most commonly, asbestos fibers fill the air when a building is renovated or demolished. The problem with asbestos fibers filling the air is that the fibers are environmentally hazardous, and, if inhaled, may cause asbestosis, mesothelioma or lung cancer. Thus, there is an urgent need to remove asbestos in tens of thousands, and perhaps hundreds of thousands, of buildings nationwide. Internationally, there are many millions of buildings from which asbestos must be removed. This will lead to many cases wherein asbestos fibers become airborne, often in an enclosed room, thereby causing a health hazard to many thousands of people.

In the past, asbestos containing materials was removed by workers wearing dust respirators and dustproof clothes. There have been a number of different methods used to remove asbestos. Asbestos layer(s) were removed by rod-type scrapers or wire brushes while spraying a wetting agent or amended water on the building material to be removed in a sealed workroom made for the removal operation. Another method of asbestos removal involves solidifying the surface of the asbestos coating by the use of a resin or a liquid chemical to encapsulate. In yet another method, asbestos-coated surfaces are enclosed with boards or the like.

While the latter two methods described above are merely temporary measures, the first-mentioned method comprising physical removal of asbestos is, in fact, a permanent solution. However, the manual removal of asbestos by use of rod-type scrapers or wire brushes requires much labor and leads to high working expenses due to the need to have a person spraying a wetting agent for dust suppression for each person removing building material. Most importantly, asbestos fibers generated in the removal operation are suspended in air for a long time, and the sealed workroom must be left sealed for a long time. Forced removal of the suspended asbestos fibers requires the use of HEPA filters and a large-capacity dust collector, leading to extremely high working expenses. Additionally, the manual removal of asbestos by the workers has the problem that many portions of asbestos tend to be left unstripped, particularly at narrow areas near corners or the existing piping, and the portions of asbestos left unstripped may scale off later. Furthermore, even with the use of the dust collector, a small amount of the asbestos fibers separated from the original surface may remain in air or accumulate at the corners of the floor, the asbestos fibers being very difficult to collect.

Dust suppression is used to clean the air of particulate matter. The particulate can be inorganic material such as asbestos (chrysotile, amosite, crocidolite, tremolite, actinolite, anthrophyllite, etc.), asbestiform minerals, silica, metals, salts or manmade polymers such as nylon, plastic, fiberglass, nanoparticles, etc. Particulate matter can also originate from biological materials such as germs, insects, plants, animal based allergens, proteomic proteins of health concerns, etc. The particles can be from 1 micron to 50 microns or smaller which is measured in nanometers. 1 micron equals 1,000 nanometers.

Various dust suppressant compositions and methods are known in the art for spraying in air to reduce air-borne dust or for spraying on substances which develop dust.

U.S. Pat. No. 4,369,121 (Callahan et al.) discloses a composition for controlling dust which comprises a cellulose ether and a wetting agent such as an ethylene oxide condensate of nonyl- or octylphenol, ethylene oxide condensates of straight chain alcohol, fatty acid amides, quaternary ammonium compounds, organic phosphate esters, and sulfonic acids.

U.S. Pat. No. 4,169,170 (Doeksen) discloses a composition and method for controlling dust during coal transportation wherein the composition comprises an aqueous solution containing an asphalt emulsion or a black liquor lignin product and a water soluble ethoxylated alkyl phenol.

U.S. Pat. No. 4,425,252 (Cargle et al) discloses an aqueous coal dust abatement composition including a water soluble sulfonic acid salt and ethoxylated nonyl phenol.

U.S. Pat. No. 4,428,984 (Shimizu et al) discloses a method of preventing dusts by spreading an aqueous solution including an ethoxylated alkyl phenol, alcohol, fatty acid, amine or fatty acid amide and a polyhydric alcohol.

U.S. Pat. No. 4,487,615 (Taylor et al.) discloses a method of reducing mine dust by spraying water including a surfactant produced by reacting ethylene oxide with linear primary alcohols.

U.S. Pat. No. 4,136,050 (Brehm) and U.S. Pat. No. 4,171,276 (Brehm) disclose a dust suppression composition comprising an aqueous solution of alkyl phenoxy polyethoxy ethanol and a copolymer of ethylene oxide and propylene oxide.

U.S. Pat. No. 5,052,756 (Wada et al.) discloses a process for separation of an asbestos-containing material from a surface to which the asbestos-containing material is adhered, while preventing floating of dust of the removed asbestos-containing material. The process requires jetting of pressurized water from a plurality of nozzles to the surface at a pressure of at least 80 kg/cm·sup·2 so as to wet and remove the asbestos-containing material therefrom by the energy possessed by the pressurized water.

Dust suppression for interior spaces is generally accomplished by using a combination of engineering controls and a misting agent. Misting agents are sometimes referred to as “amended water” or water with a surfactant. The term “amended water” comes from 29 CFR 1926.1101 or the OSHA regulations for asbestos in construction. Fogging is another term used in some applications common to greenhouses and cleanrooms where pesticides are administered.

The air is misted with the misting agent. The water droplets from the misting agent adhere to the particulate material in the air that is the offending agent to health or the environment. This increases the weight of the particulate material. This forces the particulate material to drop to surfaces due to the increased weight or specific gravity. This allows the particulate materials to be removed by cleaning methods on surfaces or to be "locked down" to a surface (such as a floor or wall) with a paint or sealer so the particles are permanently adhere to the surfaces.

The problem with the first scenario is that the misting agent must not evaporate too quickly or the particulate material will become airborne again. The problem with the second scenario of the particulate materials is that the asbestos needs to be removed rather than hidden under a paint, glue or polymer film that may be disturbed during a future renovation or catastrophic event like fire, flood, etc.

In each circumstance, the offending agent or particulate is removed from the air to prevent the particulate from entering the respiratory tract and possibly the bloodstream. Environmental controls use techniques such as pressurization (positive and/or negative) differentials of a contained area and mechanically exhausted through a HEPA filter and/or water baffle. This is largely done to limit cross-contamination during the removal of the particulate material or offending agent.

Towards that end many of the techniques involve the use of "negative air pressure differential" conditions, which are not desirable because the "amended water" droplets are pulled out of the contained area too quickly and the surfaces dry too quickly to capture particles effectively.

The contained area is usually "flooded" with amended water in an attempt to ensure particle capture. It takes a high amount of the "amended water" due to the use of the negative air pressure machines. The job site becomes awash in water that must be constantly removed. The area is saturated, sometimes causing water damage to the non-remediated areas. Microbial growth is encouraged by the high-humidity conditions brought about by traditional methods.

The above dust suppressing compositions and methods all have various disadvantages in that the compositions are not immediately effective and require an extended time for satisfactory performance or that the compositions include excessively toxic or other less biodegradable materials.

There is therefore a need for a dust suppressant composition which quickly enhances the settling of air-borne dust and which is substantially biodegradable and benign in the environment.

SUMMARY OF THE DISCLOSURE

Accordingly, this disclosure teaches a composition and process which makes it possible to remove floating particulates or prevent the dissemination or particulates, by the misting of a solution that readily captures any particulate material in the air.

More specifically, the present disclosure teaches the composition and use of compounds that are semi-volatile organic compounds (SVOCs) or slow evaporators in water-based carriers with surfactants as the misting/fogging agent for dust suppression. The particulate material is lowered to surfaces and removed by vacuuming, damp-wiping or using a dry cloth with a cationic charge (static cloth).

For the purposes of this application, a semi-volatile organic compound (SVOC) is an organic compound which has a boiling point higher than water and which may vaporize when exposed to room temperature (or higher).

Misting or fogging with this type of agent replaces traditional "amended water" spraying during dust-producing activities. This method relies on the slow-evaporating misting agent's ability to capture and hold particles long enough to be captured by wiping or vacuuming. This disclosure is more economical, environmentally preferable or green and more efficient than current methods or uses.

In another embodiment of the disclosure, dust suppression is performed under "neutral air pressure differential" conditions because the "mist" or "fog" should remain suspended in the air for a sufficient time to capture particles.

In one embodiment of this disclosure, particles as low as 10 nanometers can be captured and removed.

In yet another embodiment of the disclosure, surfactants are used to help keep the water tension at a desirable level to bind the particulate materials.

DETAILED DESCRIPTION OF THE DISCLOSURE

Following or during the removal of asbestos or dust laden materials during the renovation or demolition of a building, ship, or machinery, a fine mist or spray should use the composition containing the semi-volatile organic compounds which is preferably applied to suppress and trap asbestos, dust, and other airborne particles.

More specifically, these SVOC compounds include but are not limited to: phenols, phenyls, benzyls, glycols, glycerol, butadienes, carboxyl groups, terpenes, phthalates, anthracenes, isophorenes, plant esters, ketones, amines, glycol ethers, pyrenes, toluenes, heterocyclic compounds, polycyclic aromatic hydrocarbons, mono and di aromatics, polyols, xanthenes, plant essential oils, enzymes from microbes, etc, and combinations thereof. The most preferred compounds are phenol, sodium phenate and glycerol. However, the choice of SVOCs may be dependent on humidity, temperature, overall climate, material being removed, gallons per hour of mist spray, cubic feet of air being cleaned, etc. Also, a mixture of SVOC's may be used, so that different particles of different sizes and charges may be captured. A preferred mixture of SVOC's may include phenol: 1.56%, and sodium phenate: 0.06%

The SVOCs may comprise from between about 0.25% and about 20% of a mixture by weight, with a preferable range of between about 0.25% and about 10%.

The use of these compounds will require respirators that have filters rated by CDC NIOSH for "organic vapors" to follow OSHA regulations.

The mixture also contains surfactants and/or detergents to help keep the water tension at a desirable level to bind the particulate materials. Surfactants and/or detergents also help emulsify the SVOCs in the water carrier. The surfactants and/or detergents that are used may be borates, cationic surfactants, anionic surfactants, neutral charged surfactants, amid surfactants, etc. These compounds include but not limited to: Sodium dodecylsulfate (SDS), Sodium deoxycholate (DOC), N-Lauroylsarcosine Sodium salt, Lauryldimethylamine-oxide (LDAO), Cetyltrimethylammoniumbromide (CTAB), Bis(2-ethylhexyl)sulfosuccinate Sodium salt, 1-Octanesulfonic acid sodium salt, Sodium 1-butanesulfonate, Sodium 1-decanesulfonate, Benzalkonium chloride, Benzethonium chloride, N-Dodecyl-N,N-dimethyl-3-ammonio-1-propanesulfonate, lignin based surfactants, coconut based surfactants, etc. It is preferable to use sodium dodecylsulfate (SDS), as surfactants, and most preferable to use sodium borates. A mixture of cationic surfactants, anionic surfactants, and nonionic surfactants can be used. Overall, the total surfactants can range from about 0.1% to 3% by weight.

Optionally, other components may be included in the solution. These components include

| SVOC % | Surfactant/Detergent % | Optimum Water % |
|---|---|---|
| Lavender oil: 0.02-2%; 1%, *Glycerol: 0.2-1%; 0.5% | Quaternary Ammonium: 0.25-25%; 25% *Glycerol: 0.2-1%; 0.5% | 73.5% |
| *Glycerol: 0.2-1%; 0.5%, D-limonene: 0.5-2%; 1%, | Benzethonium chloride: 0.25-2%; 1%, *Glycerol: 0.2-1%; 0.5% | 97.5% |
| Pine oil: 0.25-2%; 1%, Thymol: 0.25-2%; 1%, Eucalyptol: 0.25-2%; 1%, *Glycerol: 0.2-1%; 0.5% | Lignin Surfactants 1%, *Glycerol: 0.2-1%; 0.5% | 95.5% |
| Phenol: 0.31-2%; 1.56%, Sodium phenate: 0.01-0.1%; 0.06%, *Glycerol: 0.2-1%; 0.5% | SDS: 0.06-0.4%; 0.3%, Sodium borate: 0.9-0.55; 0.47%, *Glycerol: 0.2-1%; 0.5% | 97.11% |
| O-phenylphenol: 0.04-0.3%; 0.22%, *Glycerol: 0.2-1%; 0.5% | Benzethonium chloride: 0.14-0.8%; 0.70%, *Glycerol: 0.2-1%; 0.5% | 98.58% |
| Oil of Laurel: 0.25-2%; 1%, Linalool: 0.25-2%; 1%, *Glycerol: 0.2-1%; 0.5% | Triton 100: 0.1-1%; 0.5% *Glycerol: 0.2-1%; 0.5% | 97% |

Each set of numbers starts with a percentage range followed by the optimal percentage after the semicolon
*Glycerol is both a SVOC and a surfactant Water is given in optimum levels but may change with the range used.

Perfume agents may be added at approximately 0.05% in place of water.

There is little need for adding emulsifying ingredients since surfactants and detergents tend to emulsify the SVOC's that are slightly miscible.

There is little need for adding preservative ingredients since surfactants, detergents and some SVOCs tend to act as preservatives (examples: Phenols, quaternary ammoniums, etc).

Different combinations of aromatic compounds (SVOCs) and surfactants can be mixed at small amounts each to achieve the same as large amounts of a singular aromatic SVOC compound and a singular surfactant.

Mixing combinations of compounds may lower toxicity while maintaining the benefits of the disclosure.

The aromatic compounds are also emulsified so the water molecule(s) slowly evaporate without creating any permanent films like a paint, polymer, plastic, etc. Polarity is only important to the point of combining or emulsifying the aromatic chemicals to water in a manner that slows the rate of evaporation.

As noted above, a major problem with traditional dust suppression techniques is the large amount of "amended water" that must be used due to the concurrent use of engineering controls such as negative air pressure differential enclosures. This negative air pressure commonly used in asbestos abatement (OSHA 29 CFR 1926.1101) and microbial remediation (ACGIH) causes many possible misting agents to evaporate too quickly. These regulations and publications call for a negative pressure differential enclosure measured with a manometer at negative 0.02 inches of water column or greater. This is equal to negative 5 pascals or greater. Generally this means there is approximately 4 air changes per hour or greater as more air leaves the contained area than enters it. The purpose of the contained area under negative air pressure is to help prevent cross-contamination at the expense of using more water than necessary at the expense of our natural resources.

The new method is "environmentally preferable" or "green" due to the significant reduction in water usage and electrical usage. First, the misting agent is a slow evaporator. Second, the work areas are contained with "critical control barriers" and necessary plastic sheeting or other material to prevent migration of contaminants outside the work area. Preferably, the work area is under "neutral" air pressure differential or between +0.02 to −0.02 inches of water column. Preferably, only the areas under negative air pressure are the decontamination chambers where workers remove waste material or their personal protective equipment before passing through the shower between the equipment room and the clean room or entrance/exit. (equipment room, shower)

There are various machines that can be used to mist or fog the air with the misting agent. It should be noted that there is a difference between the terms "misting" and "fogging". Fogging is to produce an average micron band size of 50 microns or less. Some water droplets will be below or above 50 microns but the average size of the droplets will be 50 microns in diameter. Misting is producing an average micron range for droplets above 50 microns. Either type of machine will work for misting the air for dust suppression. The fogging approach takes more time to settle since the water droplets are smaller and float more easily. Misting uses a little more liquid and the larger droplets fall more rapidly. Both types of machines require the use of respirators. The type of machines to dispense the misting agent are manufactured by Fog Master, B&G, ElectroFan, and Dramm. These types of machines that can be used to mist or fog the misting agent All of the machines generally work the same way. Each fogger or mister creates enough pressure to disperse the misting agent at a small droplet size at various volumes per minute through one or more orifices, depending on motor sizes and preference.

Hand pumps that are used to dispense pesticides and herbicides that could also be used. These inexpensive devices would dispense greater amounts of the misting agent at much larger water droplet sizes with more labor which would partially offset the "green" benefits as well as reduce labor costs.

On large projects, this lack of a need for large HEPA filtered negative air machines will greatly reduce electrical usage while helping to reduce the amount of water required by 80% to 95% versus typical misting processes using other reagents or solutions.

The amount of the cleaning solution used varies from project to project, but one gallon of the proposed solution should be create a cloud of water droplets that capture particles in an 80,000 cubic feet area when dispensed by a B&G fogger. The machines generate an aerosol of liquid droplets that adheres to the particulates floating in the air as the droplets descend to horizontal surfaces. This area coverage amount could be less if personnel wear motor operated air purifying respirators (PAPR) which help supply air through filters to the respirators. The PAPR respirators would filter the air next to the motor of the personnel using the PAPR equipment which would necessitate further application of the misting or wetting agent. Also, continual releases of construction material or other particulate generating activities may necessitate further misting or fogging for this solution. At any rate, the amount of product required will be far less in volume than traditional misting or fogging agents that evaporate too quickly.

As the mist removes the particulate material from the air, the particulate material settles on surfaces. The settled particulate material is then removed by HEPA vacuuming, damp-wiping or using a dry cloth with a cationic charge (static cloth). For definitional purposes, the HEPA filter is a high efficiency particulate air filter that can capture particles down to 0.3 microns at a capture rate of 99.97 percent. Some HEPA filters are now even more sensitive. Damp wiping can be done with natural or synthetic fiber based cloths that are damp with any liquid including the misting or fogging agent. The damp wipe cloths can be disposed as waste material or laundered depending on the target agent removed from the air and surfaces.

While this disclosure has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications, alternative constructions, and equivalents encompassed within the spirit and the scope of the invention.

What is claimed is:

1. A method for removing a solid contaminant from ambient air within an enclosed building, said method comprising:

a) obtaining a liquid mixture, said liquid mixture comprising:

i) at least one compound, wherein at least one of said at least one said compound is a semi-volatile organic compound; and ii) water;

b) spraying in an atomized form said liquid mixture into said ambient air of and within said enclosed building to remove said solid contaminant;

c) allowing for said atomized form of said liquid mixture to intermingle with said solid contaminant in the ambient air and to be pulled down by gravity until said liquid mixture now containing said solid contaminant falls from the ambient air to land on a surface; and d) removing said liquid mixture containing said solid contaminant from said surface upon which said liquid mixture containing said solid contaminants lands, wherein said at least one of said at least compound being a semi-volatile organic compound is selected from the group consisting of: phenols, phenyls, benzyls, glycols, glycerol, butadienes, carboxyl groups, terpenes, anthracenes, isophorenes, plant esters, ketones, amines, glycol ethers, pyrenes, toluenes, heterocyclic compounds, polycyclic aromatic hydrocarbons, mono and di aromatics, polvols, xanthenes, plant essential oils, enzymes from microbes, and combinations thereof.

2. The method according to claim 1, wherein said semi-volatile organic compounds are selected from the group consisting of phenol, sodium phenate, and glycerol.

3. The method according to claim 1, wherein said liquid mixture further comprises a detergent.

4. The method according to claim 1, wherein said liquid mixture further comprises a surfactant.

5. The method according to claim 4, wherein said liquid mixture comprises:

a) from about 0.25% to about 20% said semi-volatile organic compounds;

b) from about 0.1% to about 3% said surfactants; and c) from about 70% to about 99.5% said water.

6. The method according to claim 5, wherein said liquid mixture comprises from about 0.25% to about 10% semi-volatile organic compounds.

7. The method according to claim 1, wherein said semi-volatile organic compounds were emulsified.

8. The method according to claim 1, wherein an area to be treated is under "neutral" air pressure differential.

9. The method according to claim 1, wherein said liquid mixture is introduced into said area by a technique selected from the group consisting of misting and fogging with the size of sprayed droplets being less than about 50 microns.

10. A method of decontaminating ambient air within an enclosed building, comprising:

a) obtaining a liquid mixture, said liquid mixture comprising:

i) at least one compound, wherein at least one of said at least one said compound is a semi-volatile organic compound; and ii) water;

b) spraying in an atomized form said liquid mixture into said ambient air of and within said enclosed building to remove said solid contaminant;

c) allowing for said atomized form of said liquid mixture to intermingle with contaminants in the ambient air and to be pulled down by gravity until said liquid mixture now containing said contaminant falls from the ambient air to land on a surface; and d) removing said liquid mixture containing said contaminants from said surface upon which said liquid mixture containing said solid contaminants lands, wherein said at least one of said at least compound being a semi-volatile organic compound is selected from the group consisting of: phenols, phenyls, benzyls, glycols, glycerol, butadienes, carboxyl groups, terpenes, anthracenes, isophorenes, plant esters, ketones, amines, glycol ethers, pyrenes, toluenes, heterocyclic compounds, polycyclic aromatic hydrocarbons, mono and di aromatics, polyols, xanthenes, plant essential oils, enzymes from microbes, and combinations thereof.

* * * * *